Oct. 25, 1927. 1,647,076
T. F. BOYLAN, SR
METHOD OF MANUFACTURING HORSESHOE CALKS
Filed Jan. 21. 1925

WITNESSES:

INVENTOR
Thomas F. Boylan, Sr.
BY
ATTORNEYS.

Patented Oct. 25, 1927.

1,647,076

UNITED STATES PATENT OFFICE.

THOMAS F. BOYLAN, SR., OF NEW BRUNSWICK, NEW JERSEY, ASSIGNOR TO EVER-SHARP MANUFACTURING CO., OF NEW BRUNSWICK, NEW JERSEY, A CORPORATION OF NEW JERSEY.

METHOD OF MANUFACTURING HORSESHOE CALKS.

Application filed January 21, 1925. Serial No. 3,876.

This invention relates to horseshoe calks and has particular reference to a calk of the drive pattern and to a method of manufacturing the same from a high carbon steel wire.

Heretofore no successful method has been found for manufacturing horseshoe calks from high carbon steel wire by a cold process and hence their manufacture has been limited to the drop forging process which in addition to entailing a greater expense has failed to produce a calk in which the material is of the proper texture and durability.

One of the outstanding objects of the present invention comprehends a method of manufacturing horseshoe calks from high carbon steel wire by a cold process that is by working or pressing the material while cold to cause the same to flow under the action of the tools and dies employed for the purpose.

The invention further resides in the provision of a horseshoe calk and method of manufacturing the same which embody the features of simplicity, cheapness and efficiency.

With the above and other objects in view the invention resides in the method of manufacturing horseshoe calks which will be more clearly set forth in the following description, illustrated in the annexed drawings and particularly pointed out in the appended claims, it being understood that variations and modifications which properly fall within the scope of the claims may be resorted to when found expedient.

In the drawings—

Figure 1:
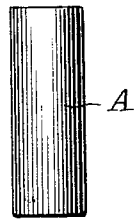
Figure 1 is a side view illustrating a piece of high carbon steel wire which has been cut off from a length of the same.
Figure 2:
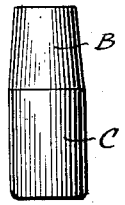
Fig. 2 is a similar view after the billet has been operated upon to effect the forming of the shank and the upsetting of the remaining portion.
Figure 3:
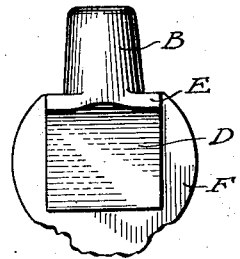
Fig. 3 is a similar view illustrating the next step in the method which effects the shaping of the offset blade and the finishing of the shank to the proper size and taper with the flash or residue of material extending from the blade.
Figure 4:
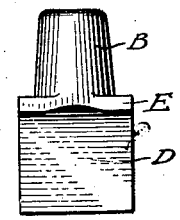
Fig. 4 is a similar view with the flash or residue removed and illustrating the finished calk.
Figure 5:
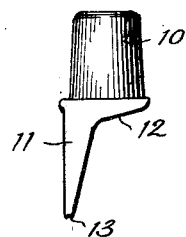
Fig. 5 is an edge view thereof.
Figure 6:
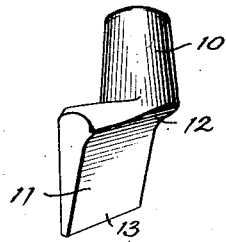
Fig. 6 is a perspective view of the finished calk.

In carrying the invention into practice, a length of high carbon steel wire is cut off into the required length to produce a substantially cylindrical billet A illustrated in Fig. 1 the same being preferably accomplished by feeding the wire into a double stroke header. The billets A are then positioned in a die and struck one blow to form the same into a shank B of substantially its finished size and taper which operation simultaneously upsets the remaining portion C to a size essential to give the proper amount of flash and filling out of the shoulder. The shank B is then inserted in a suitable die preferably the die of a toggle press and the remaining portion C is subjected to the pressure of a forming tool which simultaneously shapes the blade D, shoulder E and flash or residue F extending from the blade in addition to finishing the shank B to the proper size and taper. The final step or operation consists in trimming off the flash or residue F which produces the finished calk as illustrated in Figs. 4, 5 and 6. It is of course understood that the calks may be placed in a tumbling barrel to smooth off the rough edges if desired but inasmuch as this forms no part of the method, the same does not constitute an essential step thereof.

From the foregoing the herein described method of manufacturing drive pattern horseshoe calks by the cold process consists essentially in cutting a length of high carbon steel wire while cold into the required lengths, entering said lengths into a die, striking the projecting end to form a tapered shank to approximately its finished size and taper while simultaneously upsetting the remaining portion projecting from the die to the size necessary to give the proper amount of flash and filling out of the shoulder and blade, subjecting the shank and remaining portion to the pressure of a forming tool for simultaneously shaping the blade and shoulder and finishing the shank to the proper size and taper and then trimming off the flash or residue extending from the blade. During the process the pressure on the material causes the same to flow when cold so that the character or texture of the metal is not changed from its original condition and hence the finished product embodies all of the attributes or virtues of the original material while the method or process materially reduces the expense of production relative to the drop forging process which is now in general use.

From the foregoing it will thus be seen that a comparatively inexpensive method of making the same has been devised in which the method is simple and efficient.

I claim:

1. The herein described method of manufacturing drive pattern horseshoe calks by the cold process consisting in cutting off to the required length sections of a high carbon steel wire while cold, entering into a die one end of said section, striking the opposite end of said section to form a tapered shank to approximately its finished size and taper and simultaneously effecting the upsetting of the remaining portion of said section, entering the approximately finished shank in a second slightly larger tapered die with the upset portion protruding therefrom, subjecting said apertured upset portion to pressure between a stationary and movable die member whereby to simultaneously shape an offset blade having a flash, and force an additional quantity of the apertured upset portion into said second die, holding the shank to finish the shank to the exact size and taper, and then trimming off the flash or residue from the blade.

2. The herein described method of manufacturing drive pattern horseshoe calks consisting in cutting off to the required length from a cold high carbon steel wire sections of said wire, subjecting the same to the action of a die for forming by impact a tapered shank at one end of the section to approximately its proper size and taper while simultaneously upsetting the remaining portion, entering the shank in a second tapered die with the upset portion protruding therefrom and overlying a stationary flat table, subjecting said projecting portion to the action of a die movable toward the table for simultaneously forcing a quantity of the protruding portion into the second shank-holding die to form and finish the shank to the exact size and taper and for shaping the remaining portion of said section into an offset blade defining a shoulder having a flash or residue extending outwardly therefrom and then trimming off the flash or residue to produce the finished article.

3. The herein described cold method of producing drive pattern horseshoe calks consisting in feeding a length of cold high carbon steel wire into a double stroke header for cutting off into the required lengths sections or billets, entering into a die one end of the sections or billets striking the opposite ends of said sections or billets to form a tapered shank at one end and to upset the portion projecting from the die, inserting the shank end of the section or billet as formed in a slightly larger die of a toggle press with the upset portion projecting therefrom, exerting pressure thereon by a forming tool moved against a stationary table for shaping the blade and simultaneously forcing and flowing into the die, some of the excess metal of the projecting portion forming the blade to finish the shank to its proper size and taper, and then trimming off the edges of the blade.

4. The herein described cold method of manufacturing drive pattern horseshoe calks consisting in introducing one end of a length of high carbon steel wire into a tapered die, subjecting the opposite end to an impact for forming at the first mentioned end a tapered shank to approximately its proper size and taper while simultaneously upsetting the remaining portion projecting from the die, inserting the tapered shank into a tapered die of slightly larger size than the first die, simultaneously subjecting the upset portion to the pressure of a forming tool for shaping a blade from the upset portion and for finishing the tapered shank to its proper size and taper by forcing and flowing some of the excess metal from the blade into the shank die and then trimming off the edges of the blade.

5. The herein described method of manufacturing die pattern horseshoe calks by a cold process from high carbon steel wire billets, including the steps of entering one end of each billet into the enlarged end of an open-ended frusto-conical die, striking the opposite end of said section to form a tapered shank of a size slightly less than its finished size and taper and simultaneously effecting the upsetting of the remaining end of said billet, entering the approximately finished shank into the open enlarged end of a second frusto-conical die with the upset end protruding therefrom, subjecting said apertured upset portion to pressure between a stationary flat surface and a movable blade forming die member whereby to simultaneously shape an offset blade having a flash or residue and to force and flow some of the excess metal from the blade forming portion into the die holding the shank to finish the shank to the exact size and taper, and finally trimming off the flash or residue from the edges of the blade.

THOMAS F. BOYLAN, Sr.